J. R. ROGERS.
CLUTCH.
APPLICATION FILED MAR. 11, 1914.

1,327,880.

Patented Jan. 13, 1920.
2 SHEETS—SHEET 1.

Witnesses:
Inventor
John R. Rogers
By his Attorneys

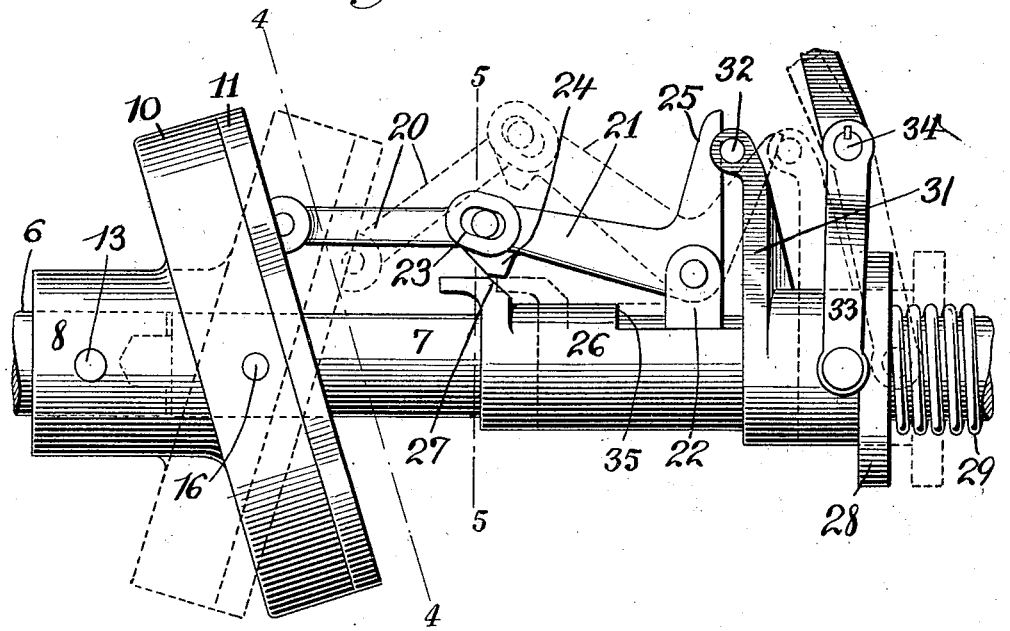
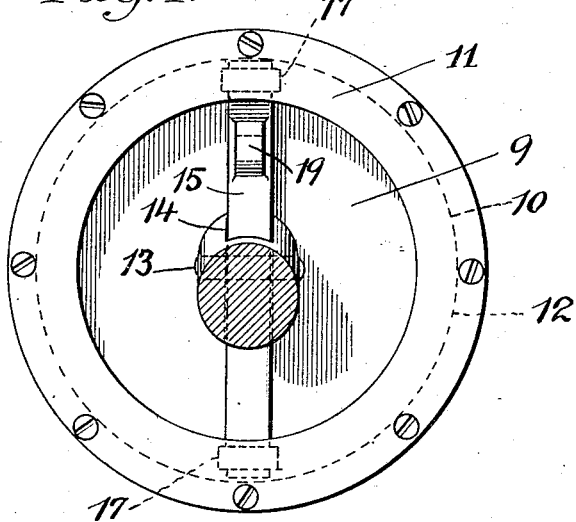
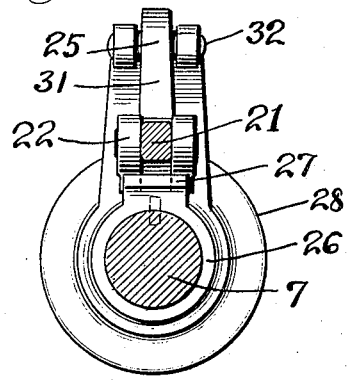

UNITED STATES PATENT OFFICE.

JOHN R. ROGERS, OF BROOKLYN, NEW YORK.

CLUTCH.

1,327,880.  Specification of Letters Patent.  Patented Jan. 13, 1920.

Application filed March 11, 1914. Serial No. 823,849.

*To all whom it may concern:*

Be it known that I, JOHN R. ROGERS, a citizen of the United States of America, residing in the borough of Brooklyn, city of New York, State of New York, have invented a new and useful Improvement in Clutches, of which the following is a specification.

My invention relates to a clutch or connecting mechanism designed for use in connecting together a driving and a driven shaft, particularly that type of device which finds use in connection with automobiles or similar machines, although the invention is not to be understood as being limited to such use as it as well finds application wherever a clutch or similar mechanism may be employed. The object of my invention is to provide a clutch which will be cheap to make, efficient in continuous use and operation, necessitating a minimum of repair and attention and safe in that it will lock the members firmly together while permitting slight initial slipping to obviate sudden jars caused by a too quick locking engagement. My new device can furthermore be made of small dimensions without departing from its clutching or locking efficiency.

I accomplish the objects of my invention broadly by providing two members, mounted respectively on the driven shaft and on the driving shaft, one of said members being fixedly mounted on one of said shafts and the other pivotally mounted on the other of said shafts, said fixed member being inclined at an angle to the axis or center line of the shafts and said pivotally mounted member being capable of free movement about said shafts with said fixed member, together with means for locking said members together.

In the following I have described, in connection with the accompanying drawings, a structure illustrating one embodiment of my invention.

In the drawings Figure 1 is a side elevation, parts being broken away, showing a structure embodying one form of my invention, the clutch members being locked together;

Fig. 3 is a view similar to Fig. 1 but showing the parts in two different positions the clutch members being disengaged, one position being shown in full lines and the other in dotted lines;

Fig. 4 is a sectional view along the line 4—4 of Fig. 3, looking to the left; and Fig. 5 is a sectional view along the line 5—5 of Fig. 3, looking to the right.

Similar numerals of reference indicate similar parts throughout the several views.

Figure 1:
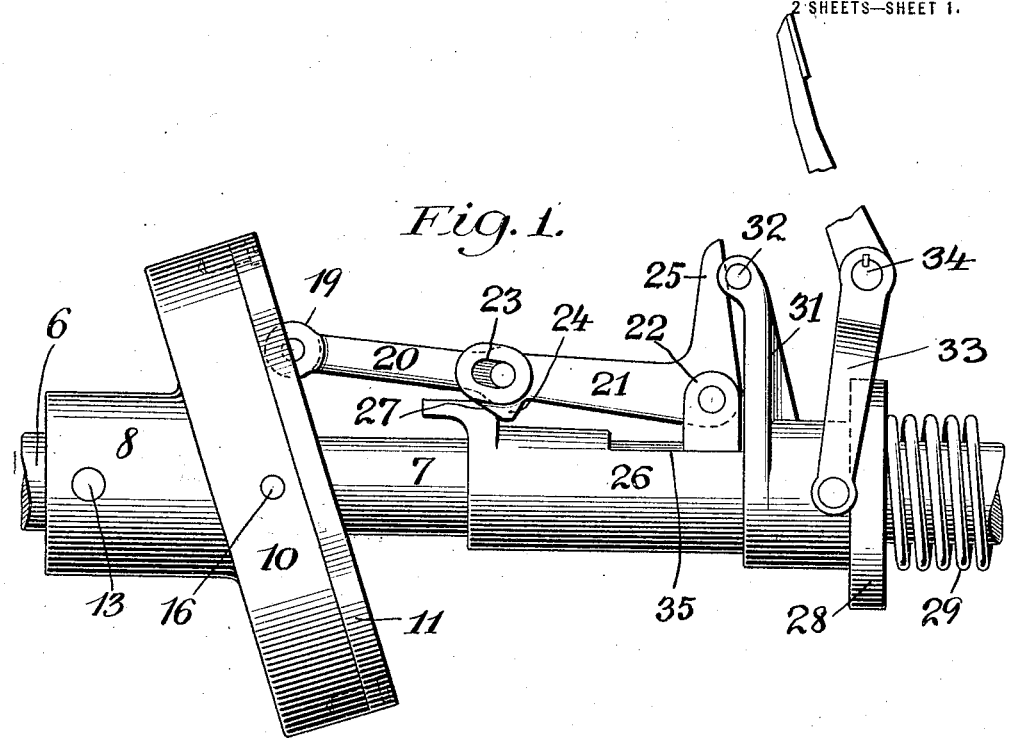

As shown in the drawings, 6 indicates the driving shaft and 7 the driven shaft. The fixed member of the two clutch members is here shown as a casting comprising a sleeve 8 and an inclined face 9 provided with a peripheral flange 10 so as to form a cup shaped structure partly closed by a ring 11 bolted or otherwise secured to the flange 10, so as to form a groove or raceway 12 around the inner circumference of the flange 10. The casting is shown as fast to the driving shaft by means of a bolt 13. The face 9 is inclined relative to the axis of the shafts.

Figure 2:
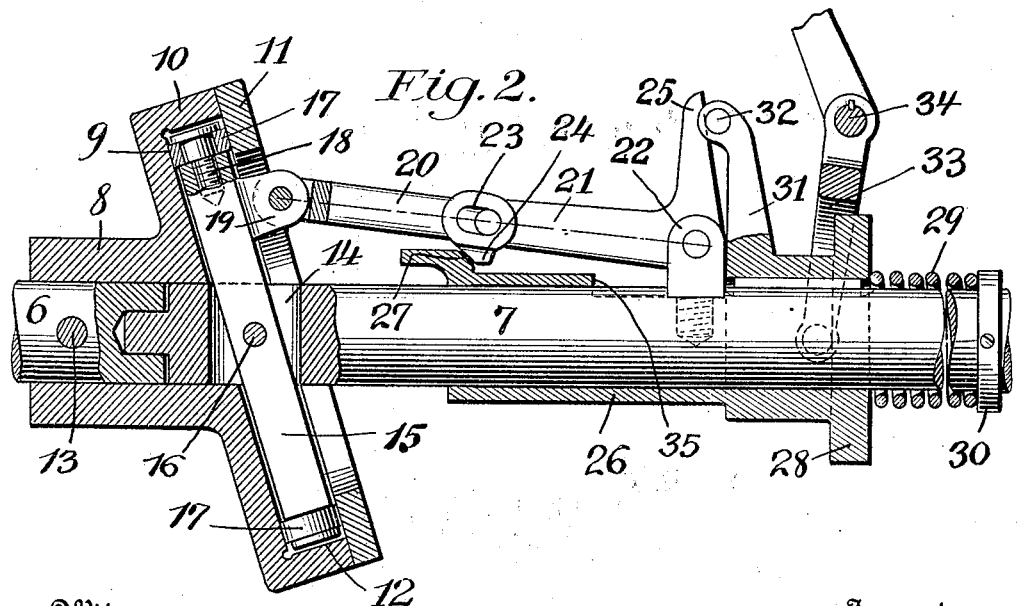
Fig. 2 is a longitudinal, vertical, sectional view, parts being shown in full lines and parts being broken away, of the structure shown in Fig. 1 in the position shown in Fig. 1.

The driven shaft is shown as extending through the fixed member of the clutch into the sleeve 8 so as to find a bearing in said sleeve and in the inner end of the driving shaft as shown in Fig. 2. 14 indicates a slot cut diametrically through the driven shaft adjacent its outer end as shown in Fig. 2.

The pivotally mounted member of the two clutch members is here shown as a flat bar 15 centrally pivoted to the driven shaft in the center of slot 14 by means of pivot pin 16, bar 15 thus having a rocking motion about the pivot pin on the center of the driven shaft. Bar 15 carries at each end a roller 17 held thereto by a suitable bolt 18, the rollers being adapted to contact with and roll against the inclined face 9 and the inner surface of ring 11. Near one end of the bar 15 is a lug 19 in which is pivoted one arm 20 of a toggle joint mechanism, the other arm 21 of the toggle joint being pivotally mounted in bearing 22 fast on the driven shaft 7. The two arms of the toggle joint mechanism are connected by means of a pivot pin on arm 20 entering an elongated slot 23 on arm 21, thus permitting a freedom of movement of the arms relative to each other. Arm 21 also carries a lug or inclined surface 24, for the purpose hereinafter set forth, and a lever arm 25 as shown.

26 indicates a sleeve splined on driven shaft 7, as shown in Fig. 2, so as to have longitudinal motion relative to said driven shaft. Sleeve 26 carries a lug or inclined surface 27 adapted to coöperate with lug 24 on arm 21 as hereinafter set forth. Sleeve 26 also carries a collar 28 adapted to form a bearing for spring 29, the other end of which finds a bearing against collar 30 on driven shaft 7. 31 indicates a forked member mounted on sleeve 26 and carrying a roller pin 32 adapted to bear against the upper end of lever arm 25 of the toggle joint mechanism. 33 indicates a forked foot lever pivotally mounted at 34 to any convenient support (not shown) and shown as bearing against collar 28 on the side opposite spring 29. Sleeve 26 is continually urged to the left or toward the driving shaft by means of spring 29, and is slid along the driven shaft in the other direction against the compression of the spring by foot lever 33. 35 indicates a slot in sleeve 26 so as to permit said sleeve to slide along lug 22.

When the apparatus is in the position shown in Figs. 1 and 2, the pivoted bar 15 is prevented from rocking because the spring 29 has urged sleeve 26 to the left a sufficient distance to cause forked member 31 to press the upper end of lever arm 25 inward, thus rocking toggle joint arm 21 on pivot 22 and straightening out the toggle joint until the connection between the inner ends of the two arms of the toggle joint has passed to or beyond the dead center and lug 24 has dropped behind lug 27. This locks bar 15 against rocking about pivot 16 and causes the rollers 17 to bind against face 9 and ring 11, thus in turn locking the two clutch members together.

When it is desired to release the clutch members from each other, pressure is applied to foot lever 33 thus forcing sleeve 26 to the right against spring 29 and removing member 31 from contact with lever arm 25 as shown in dotted lines in Fig. 3. The first movement of sleeve 26 to the right causes lug 27 to press against the inclined surface 24 on toggle joint arm 21 thus throwing the connection between the inner ends of the two arms of the toggle joint up beyond the dead center so that the further removal of member 31 from the path of lever arm 25 will permit the clutch member 15, in its efforts to follow the movement of the fixed clutch member, to break the toggle joint still further as indicated in dotted lines in Fig. 3. When in the dotted line position, with sleeve 26 held by foot lever 33, the pivotally mounted member of the two clutch members simply rocks back and forth on its pivot 16 without turning with the fixed member, the toggle joint opening and closing to permit such rocking movement.

As the foot lever 33 is gradually released the sleeve 26 is urged to the left by spring 29, as described, until the toggle joint is nearly straightened out, the toggle joint then having but a very slight opening and closing movement, and rollers 17 begin to bind against face 9 and ring 11. This permits a sliding or slipping engagement of the two clutch members so that when the foot lever 33 is completely released the parts will be locked firmly together without shock.

It is manifest that by holding the clutch, either by the foot lever or other suitable means, in the position shown in full lines in Fig. 3, thus permitting the action of the spring 29 against the sleeve 26 to hold the member 31 against lever arm 25, the two shafts will be locked together against any ordinary strain, but in case of an extraordinary strain the spring 29 will be compressed so as to permit the parts to assume or tend to assume the position shown in the dotted lines in Fig. 3 and thereby effect a slippage between the two shafts for one or more or a portion of a revolution and until the extraordinary strain is relieved when the spring 29 will force the parts back into the full line position. In other words, when held in the full line position shown, the spring 29 is capable of cushioning the shafts against sudden shock. Such slippage will work no harm in the form of clutch herein described, while the ordinary form of friction clutches would be injured if not destroyed by such slippage.

Such action or operation of the clutch will to a considerable extent prevent wear upon the bearings of shafts and connecting rods in automobiles and similar vehicles caused by the driving wheels encountering obstructions which momentarily arrest the rotation of said wheels when driven at a high rate of speed.

It will be noted that the rotation of the fixed member of the two clutch members, owing to its being mounted at an angle inclined to the axis of the shafts, will cause it to sucessively assume the full line position and the dotted line position shown in Fig. 3, thus imparting an oscillating motion to the pivotally mounted member when the latter is free to move without imparting rotary motion to the driven shaft.

While I have shown the member 15 as provided with rollers running on a flat surface, it is obvious that such detail is unimportant compared with the broad idea disclosed and that any equivalent device may be used as well without sacrificing the advantages of my invention.

In the claims where I have used the terms "friction surface" I mean to include the locking members broadly although they are free at times while locked together at other times.

The general principle illustrated and described herein is also shown and is more fully set forth in my co-pending application Serial No. 790,444, filed September 18, 1913, to which reference is hereby made for further details as to the mode of operation.

I do not restrict myself to any of the details shown or described further than the scope of the appended claims demand.

What I claim and desire to secure by Letters Patent is:

1. In a clutch, a driving shaft, a driven shaft, a clutch member on each of said shafts, one of said clutch members being inclined relatively to its shaft and the other clutch member pivotally mounted on its shaft and means for bringing said clutch members into coöperation with each other.

2. In a clutch, the combination of a driving shaft, a driven shaft, a friction surface fixedly mounted on one of said shafts at an angle inclined relative to the axis of said shaft, a friction surface pivotally mounted on the other of said shafts to have reciprocating motion on the longitudinal axis of said shaft, said friction surfaces being so arranged relative to each other that when one shaft is still and the other being driven the pivotally mounted friction surface is free to accommodate itself to the motion of the fixed friction surface, and means for holding said pivotally mounted friction surface against reciprocation.

3. In a clutch, the combination of a driving shaft, a friction surface fixed on said shaft at an angle inclined relative to the axis of said shaft, a driven shaft, a friction surface pivotally mounted on said driven shaft to have reciprocating motion longitudinally of said shaft when said shaft is still and the fixed friction surface is rotating, and means for locking said friction surfaces together.

4. In a clutch, the combination of a driving shaft, a clutch member fixed on said shaft at an angle inclined relative to the axis of said shaft, a driven shaft having a slot extending diametrically therethrough, a bar centrally pivoted in said slot to said driven shaft adjacent said fixed clutch member and adapted to have reciprocating motion longitudinally of said driven shaft when said fixed clutch member is rotating and the driven shaft is still, and means for holding said bar against reciprocation.

5. In a clutch, the combination of a driving shaft, a friction surface fixed on said shaft at an angle inclined relative to the axis of said shaft, a driven shaft having a slot extending diametrically therethrough adjacent said fixed friction surface, a bar centrally pivoted in said slot to coöperate with said fixed friction surface and adapted to have reciprocating motion longitudinally of said driven shaft when said fixed friction surface is rotating and said driven shaft is still, a toggle-joint having one member pivoted to said bar near one end thereof and the other member pivoted to the driven shaft, a lever arm on the toggle-joint member pivoted to the driven shaft, a sleeve splined to said driven shaft, an arm carried by said sleeve in the path of the lever arm on the toggle-joint member, a spring for forcing said sleeve and arm toward the driving shaft to straighten said toggle-joint and lock said bar against said fixed friction surface and means for moving said sleeve away from the driving shaft against said spring to permit said toggle-joint to open and release said bar from locking engagement with said fixed friction surface.

In testimony whereof I have signed this specification in the presence of two subscribing witnesses.

JOHN R. ROGERS.

Witnesses:
 SEABURY C. MASTICK,
 K. G. LE ARD.